Aug. 15, 1967     P. K. CHURCH     3,336,525

VARIABLE IMPEDANCE DISPLACEMENT TRANSDUCER

Filed Feb. 28, 1966     5 Sheets-Sheet 1

INVENTOR.
PETER K. CHURCH
BY
Anderson, Spangler & Wymore
ATTORNEYS

Aug. 15, 1967        P. K. CHURCH        3,336,525

VARIABLE IMPEDANCE DISPLACEMENT TRANSDUCER

Filed Feb. 28, 1966        5 Sheets-Sheet 3

INVENTOR.
PETER K. CHURCH
BY
Anderson, Spangler & Wymore
ATTORNEYS

Aug. 15, 1967          P. K. CHURCH          3,336,525

VARIABLE IMPEDANCE DISPLACEMENT TRANSDUCER

Filed Feb. 28, 1966                              5 Sheets-Sheet 4

INVENTOR.
PETER K. CHURCH
BY
Anderson, Spangler & Wynore
ATTORNEYS

United States Patent Office 3,336,525
Patented Aug. 15, 1967

3,336,525
VARIABLE IMPEDANCE DISPLACEMENT TRANSDUCER
Peter K. Church, Cascade, Colo., assignor to Kaman Aircraft Corporation, Bloomfield, Conn., a corporation of Connecticut
Filed Feb. 28, 1966, Ser. No. 530,652
9 Claims. (Cl. 323—75)

This invention relates broadly to transducer devices and, more particularly, to transducers operating on an eddy current basis. This application is a continuation-in-part of my copending application Ser. No. 250,180 filed Jan. 8, 1963, for Transducer, now U.S. Patent No. 3,238,479, issued Mar. 1, 1966.

Prior art devices have generally relied upon the use of the variable reluctance or variable capacitance principles to detect displacement and convert same into measurable electrical signals proportional to such displacements.

One type of transducer which has been previously used for the measurement of displacement utilizes the variable reluctance principle. A sheet of magnetic material is positioned in spaced relation to a pole piece of magnetic material supporting a coil of wire. When the sheet is moved with relation to the pole piece, or vice versa, the change in inducance and reluctance in the coil induces electrical pulses into the coil. A pair of coils, with one positioned to either side of the sheet and connected into a bridge circuit will effect a measurable unbalance therein as a function of the movement of the sheet. Such an arrangement requires a mechanical connection between the sheet and the object whose displacement is to be measured where the object cannot be positioned within the space between the coils.

Prior art devices using magnetic circuits have serious drawbacks in that the permeability of the magnetic components is temperature sensitive; the frequency response of these devices is limited and the amplitude of the output signals available is necessarily low requiring further amplification for efficient utilization.

It is an important object of this invention, therefore, to provide improved transducer devices which avoid one or more of the disadvantages of the prior art arrangements and which provide very high output sensitivities.

It is a further object of this invention to provide an improved transducer which does not require a mechanical connection to an article to be sensed in measuring the displacement between the surface thereof and the transducer sensing element.

It is a further object of this invention to provide an improved transducer which will provide a minimum output shift when subjected to a wide range of temperatures.

It is a further object of this invention to provide an improved transducer with continuous output resolution over its entire operating range.

It is a further object of this invention to provide an improved transducer adapted for direct connection to low impedance circuits.

It is a further object of this invention to provide an improved transducer arrangement useful over a wide range of pressures permitting extremely low pressure or standard pressure range units of smaller than normal configurations and having improved vibration, acceleration, shock, non-linearity, hysteresis and temperature specifications.

It is a further object of this invention to provide an improved transducer arrangement, the output signal from which is substantially devoid of harmonic distortion.

A still further object of this invention is to provide an improved transducer which is economical and simple of construction and has no moving parts.

A further important object of this invention is to provide an improved transducer arrangement capable of use in intense gamma, neutron and electromagnetic environments.

A further important object of this invention is to provide an improved transducer arrangement capable of having an essentially linear input-output relationship over a large range of input drive.

In accordance with the invention, the improved displacement transducer comprises at least two coils, each connected as an arm in an AC bridge circuit, a non-magnetic electrical conducting means movably positioned immediately adjacent and to one side of said coils for movement toward and away from said coils, and means for applying a force for causing said non-magnetic means to move with respect to said coils and vary the effective impedance of said coils as a function of such movement to unbalance the bridge circuit and provide an output indicative of the proximity of the conducting means.

For a better understanding of the present invention, together with other and further objects thereof, reference is had to the following description taken in connection with the accompanying drawings and its scope will be pointed out in the appended claims.

In the drawings:

FIGURES 10 and 11 represent schematic diagrams of a circuit arrangement for use in conjunction with the displacement transducer of FIGURE 12;

FIGURE 12 is a view in elevation, partly in section, of a displacement transducer according to the teaching of this invention;

FIGURE 13 is a view along line 13—13 of FIGURE 12;

FIGURE 14 is a cross-section representation of the displacement transducer of FIGURE 12 showing a different coil arrangement;

FIGURE 15 is a cross-section representation of the displacement transducer of FIGURE 12 showing the coil arrangement;

FIGURE 16 is a cross-section representation of the displacement transducer of FIGURE 12 showing still another coil arrangement;

Figure 2:
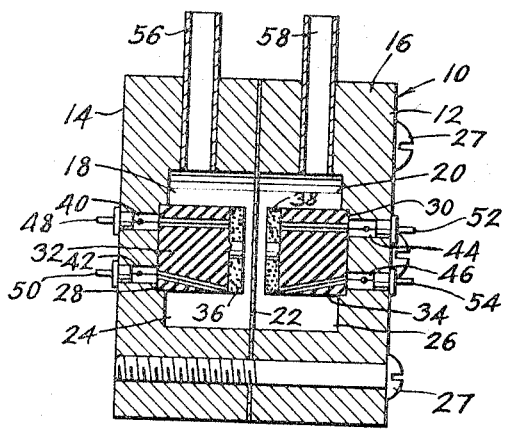
FIGURE 2 is a cross-sectional view taken at line 2—2 of FIGURE 1 showing the interior construction of a pressure sensitive transducer in accordance with the invention.
Figure 1:
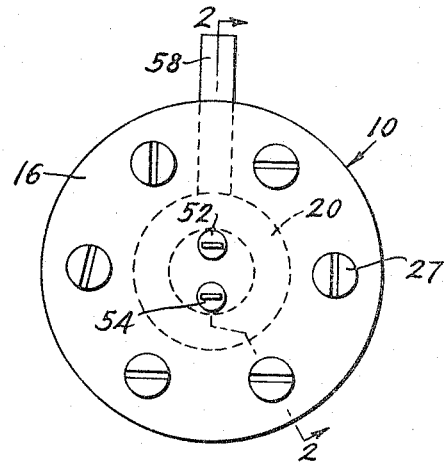
FIGURE 1 is a view in plan of one form of construction embodying the teachings of the present invention.

Referring to FIGURES 1 and 2, there is shown an improved diaphragm-type pressure transducer 10 that operates on what may be best termed a variable power loss, AC resistance or eddy current principle. This new concept allows the design and manufacture of trnsducers for pressure, linear displacement and proximity measurements having material advantages over prior art devices. The transducer of FIGURES 1 and 2 comprises a housing 12 made in two halves 14 and 16 each having a recess 18 and 20 therein. The housing halves have an electrical conducting, non-magnetic diaphragm 22 clamped therebetween, separating the space within the housing into two chambers 24 and 26, the whole being clamped together by screws 27 to effect pressure-tight joints between the several parts. The bottom of recesses 18 and 20 are provided with recesses 28 and 30 into which coil forms or cores 32 and 34 of non-magnetic, dielectric material are secured in a manner to provide a reasonably tight seal between the respective coil forms and the housing. Coil forms 32 and 34 are seen to support coils 36 and 38 thereon positioned in close proximity and to either side of diaphragm 22. The ends of coils 36 and 38 are connected to loads which may be formed integrally with the coil forms 32 and 34 or sealed therein in a suitable manner. The leads emerge from the bottom of each coil form into passageways 40, 42, 44 and 46 connecting the bottom of recesses 28 and 30 and the exterior of the housing. The outer ends of these passageways are sealed by an insulated electrical terminal 48, 50, 52 and 54 to provide a pressure-tight seal. The leads from the coil ends are connected to terminals 48, 50, 52 and 54 for connection to external electrical circuits.

Each half 14 and 16 of the housing is provided with pressure inlets 56 and 58 communicating respectively the inner chambers 24 and 26 to either side of diaphragm 22. When pressure is admitted to one of the pressure inlets, diaphragm 22 will be displaced toward an end surface of one coil while the distance between the other coil and the diaphragm will increase.

Figure 3:
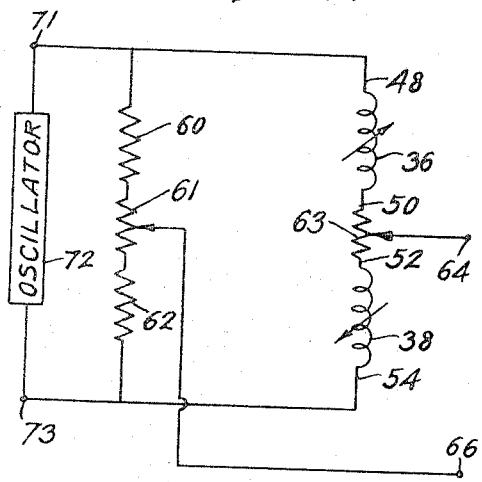
FIGURE 3 is a circuit arrangement including the transducer of FIGURES 1 and 2 directly coupled for AC output.

When the coils of the transducer are connected as two arms of an AC bridge such as shown in FIGURE 3, the output of the bridge will vary with a change in applied pressure. With the resistive arms 60 and 62 being equal and coils 36 and 38 being of equal inductance and configuration, as well as being positioned equidistant from the diaphragm, the bridge output across terminals 64 and 66 will be zero. If a pressure is applied to one side of the diaphragm through a pressure inlet to displace the diaphragm toward one coil, eddy current losses will increase in said one coil and decrease in the other producing an unbalance in the four arm bridge and an output signal representative of unbalance, due to the diaphragm position, will appear across terminals 64 and 66 which can be sensed and measured.

The transducer of this invention may be constructed entirely of non-magnetic materials avoiding the normal permeability change problems with change in temperature and harmonic distortion generation found in prior art devices requiring the presence of magnetic elements. The coils 36 and 38 are air core coils wound with insulated copper wire, anodized aluminum wire and the like. Diaphragm 22 may be made of beryllium copper or Phosphor bronze and like non-magnetic materials for most applications, whereas for other uses, a stainless steel diaphragm which has been plated with a thin layer of gold, silver, copper, aluminum, chromium, or other good electrical conductors in the area directly opposite the coil, generally identified as the "active area" of the diaphragm. The eddy current diaphragm must be of non-magnetic material and preferably, at least, the "active area" of the diaphragm is of a metal having good electrical conductivity. The greater the conductivity, the greater is the transducer output sensitivity.

The case 12 is preferably constructed of stainless steel or such other non-magnetic material having the requisite expansion rate and corrosion resistance characteristics.

The transducer design of FIGURES 1 and 2 may be provided with overload protection by extending the coil forms 32 and 34 to provide a stop for the diaphragm at a point of its travel just beyond the full range.

The transducer of this invention in using air core coils and avoiding the necessity of magnetic elements eliminates harmonic distortion being generated therein as is common to prior art devices. Further, the absence of magnetic elements allows much higher input frequencies to be utilized to advantage with higher frequency response being obtainable than with known devices.

The operation of the transducer of this invention is based upon the AC losses in the respective coils associated with eddy currents in the highly conductive element, which losses serve to unbalance an AC bridge including the coils, to produce an electrical output therefrom which is a function of the positioning of the element with respect to the coils. By proper selection of variables, the output of the bridge can be made a linear function of the forces acting on the element.

The major categories of high frequency losses that must be considered for the coil-diaphragm configuration of FIGURES 1 and 2 are: the coil losses or power dissipated as heat in the coil windings; the power loss associated with the eddy currents produced in the metal diaphragm; the coil losses due to the proximity effect; the dielectric loss; and, the loss in coil inductance because of close proximity of the diaphragm.

In considering the coil losses involved in the transducer of this invention, for DC circuits, the resistance of a conductor may be defined as:

$$(1) \qquad R = \rho \cdot \frac{l}{A}$$

Where:

$R$ = resistance in ohms
$\rho$ = resistivity in ohm-meters
$l$ = length of conductor in meters
$A$ = cross-sectional area of conductor in square meters However, as the frequency of the input current increases, the current distribution in the conductor becomes non-uniform. At high frequencies, nearly all of the current will be concentrated very near the outer surface of the conductor. This phenomenon is commonly known as the "skin effect."

Because of the uneven current distribution across a conductor at high frequencies, it will be necessary to consider the high frequency resistance as equal to the power dissipated divided by the square of the current, that is:

$$(2) \qquad R = PI^{-2} \text{ or } I^2 R = P$$

Figure 6:
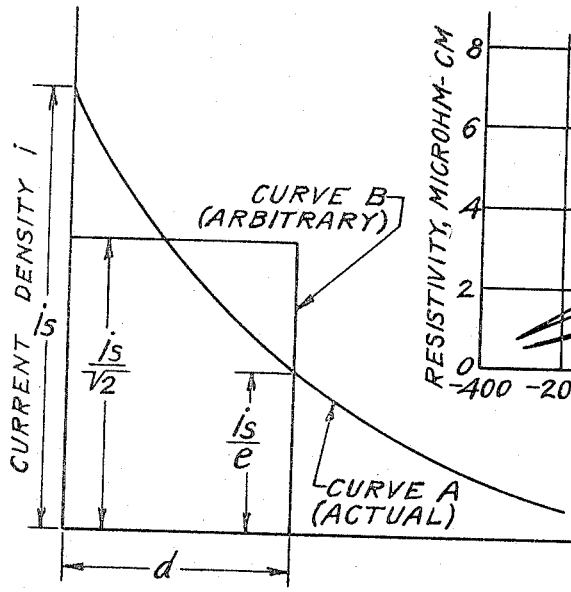
FIGURE 6 is a graphical representation of the current density as a function of depth below the surface of a conductor.

Current density at high frequencies will vary as a function of depth below the surface. As shown in FIGURE 6, the relationship of current density to depth of penetration is approximately exponential provided that the conductor is thick compared with the depth, $d$, at which the current density has decreased to $1/e$ of the surface value. The phase of the current varies directly as the depth, and at depth, $d$, lags the surface current by one radian.

It is more convenient to use an arbitrary current density with depth relationship rather than the actual, curve A, for theoretical consideration. Curve B assumes that the current density and phase are equal for a given depth below the conductor surface with no penetration below this depth. In this case, the height of the curve B must be $1/\sqrt{2}$ times the actual surface current density while the depth $d$, depicted by the curve, depends on the resistivity and permeability of the conductor as well as frequency.

This arbitrary depth of penetration, $d$, is known as skin depth and may be expressed as:

$$(3) \quad d = \sqrt{\frac{\rho}{\pi \mu f}}$$

Where:
$d$=skin depth, meters
$\rho$=resistivity of conductor, ohm-meter
$\mu$=permeability, henries per meter, and
$f$=frequency, cycles per second Equations 1 and 3 can be used to obtain several important relationships of particular interest in the instant case. From Equation 3 it can be seen that the skin depth varies directly as the square root of the resistivity of the conductor and inversely as the square root of the frequency. Since the permeability of copper, silver or other non-magnetic conductors that would be used in the transducer is very nearly equal to 1, the permeability term can be neglected for all practical purposes.

By substituting the skin depth, Equation 3, multiplied by a constant K, for the cross-sectional area in Equation 1 gives the relation:

$$(4) \quad R = K \rho l \left(\frac{\pi f}{\rho}\right)^{1/2}$$

Equation 4 shows that the high frequency resistance is proportional to the square root of the resistivity of the conductor. It also shows that the resistance is proportional to the square root of the frequency.

Rearranging Equation 2 so that:

$$(5) \quad I = \left(\frac{\rho}{R}\right)^{1/2}$$

it follows that with a constant input power to the coil, the current will be inversely proportional to the square root of the resistance.

Since the high frequency resistance is proportional to the square of the frequency, then:

$$(6) \quad I \sim f^{-1/4}$$

Also, since the power loss may be expressed as:

$$(7) \quad P = \frac{E^2}{R}$$

then, assuming a constant input voltage, the following obtains:

$$(8) \quad P \sim \frac{1}{f^{1/2}}$$

Another significant relationship exists with voltage. In an AC circuit, this is expressed as the product of current times the impedance. With air core coils of a few number of turns, as in the transducer of this invention, the DC resistance is quite small compared with reactance. Therefore, a close approximation may be made by assuming that:

$$(9) \quad E \sim IX$$

Where:
$E$=voltage
$I$=current
$X$=impedance

The reactance, $X$, of any coil equals $2\pi fl$, so that the reactance is directly proportional to frequency. Since the current is inversely proportional to the one fourth power of the frequency, Equation 6, then:

$$(10) \quad E \sim f^{3/4}$$

Eddy currents will be produced in the metal diaphragm, positioned adjacent the end of the coil, due to the flux lines that pass into it from the AC excited transducer coil. These eddy currents result in I²R losses that must be supplied by the coil. These losses, therefore, have the effect of increasing the effective resistance of the coil. The general relationships between power loss, resistance, frequency, and diaphragm material resistivity previously mentioned are applicable.

Figure 7:
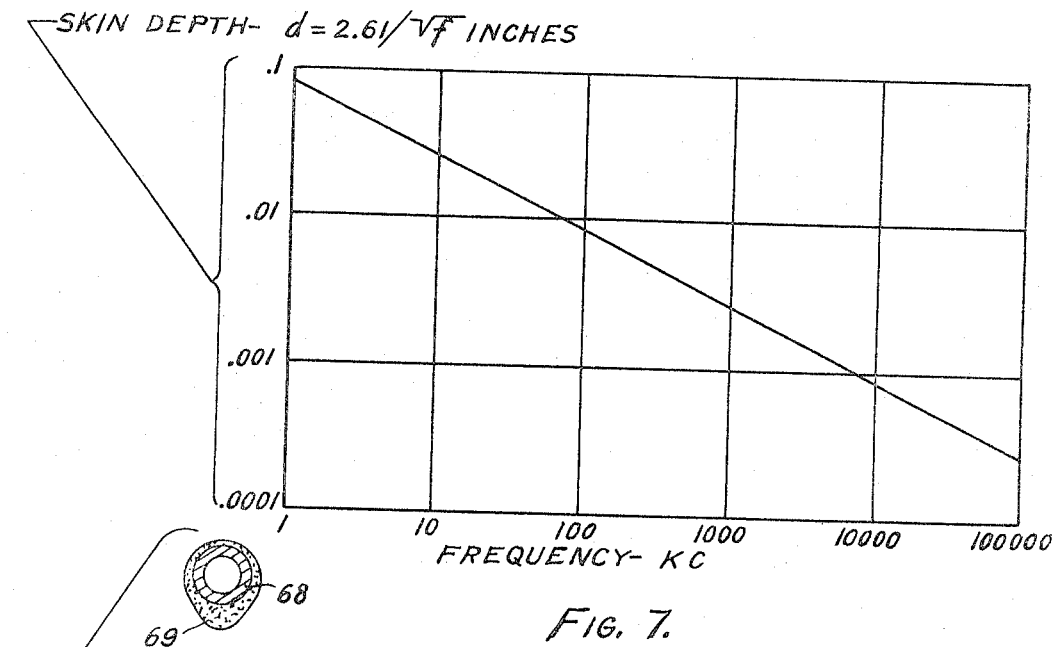
FIGURE 7 is a graphical representation of the depth of current penetration, in inches, as a function of frequency in an electrolytic copper conductor.

The depth of penetration of the eddy currents into the diaphragm likewise follows the relationship expressed in Equation 3. As the frequency of the current is raised, increasingly thinner diaphragms may be used and still provide maximum losses due to eddy currents. FIGURE 7 illustrates the depth of penetration or skin depth as a function of frequency for copper. In this case, $$\rho = 1.724 \times 10^{-8}$$

ohmmeters and $\mu = 1.26 \times 10^{-6}$ henries/meter for copper at 20° C. Substituting these values in Equation 3 gives:

$$d = 5.62\, f^{1/2} \text{ cm. or } 2.61\, f^{1/2} \text{ inches}$$

As can be seen from FIGURE 7, the skin depth in copper at 50 kc. is 0.0118 inch, at 500 kc. the effective penetration has dropped to 0.00375 inch while at 2 mc. the depth is 0.0018 inch.

Figure 8:
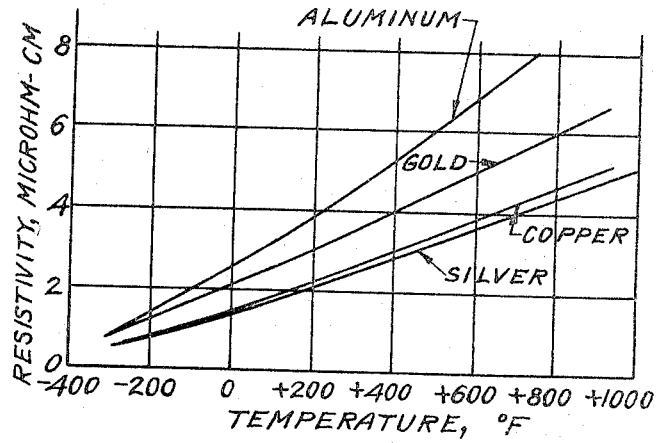
FIGURE 8 is a graphical representation of the resistivity change with temperature for silver, copper, gold and aluminum.

If the diaphragm material is varied from that of copper, the skin depth will, of course, vary in relation to any resistivity and permeability change. Since the resistivity of a given material also changes with temperature, the skin depth will vary accordingly. FIGURE 8 shows a plot of this phenomenon for silver, copper, gold and aluminum over a temperature range of −400° F. to 1000° F. In general, the good conductors will give a more linear as well as a smaller resistivity change with temperature than will alloys or poor conductors.

The proximity effect is defined as the distortion of alternating current flow in one conductor due to that of neighboring conductors. In the transducer shown in FIGURES 1 and 2, both the coil and the coil-diaphragm combination will contribute to the proximity effect.

In considering the coil by itself, there will be a redistribution of current in the windings because of the interaction of the magnetic flux produced by adjacent turns. This flux may be that caused by the exciting current as well as that produced by the eddy currents in the nearby windings.

Figure 9:
FIGURE 9 is a qualitative representation of the current redistribution as a result of the proximity of a current carrying conductor to a metal sheet.

When a flat metal plate or diaphragm is brought near to the coil, there will also be a re-distribution of current in the coil windings and the current density will be crowded on the metal sheet. This re-distribution effect has been shown in a qualitative manner and diagrammatically in FIGURE 9 for a single conductor where the conductor is represented by reference numeral 68 and the conducting sheet as 70. The current distribution 69 about conductor 68 and on sheet 70 is distorted into the space between the sheet and conductor.

Because current is now concentrated in certain parts of the conductor rather than uniformly distributed, it can be seen that the power loss or effective coil resistance will be greater than if the diaphragm or adjacent coil windings are not present.

The current re-distribution becomes more pronounced as the spacing between the conductor and plate is made smaller as well as when the coil windings are tightly wound.

With a flat, closely wound multi-turn coil, placed with its end surface parallel to the diaphragm surface, the current density will be quite uniform directly under the active coil surface. The current density will taper off quite abruptly, however, where the active surface of the coil ends providing the gap between the coil and diaphragm is kept small. In the transducer of this invention, only the "active area" of the diaphragm directly opposite the coil contributes towards varying the coil losses and consequently the transducer output signal as the diaphragm is moved.

The distributed capacitance in the coil will introduce some loss in the solid dielectrics used in the coil form or core and wire insulation. Bringing the diaphragm close to the coil tends to increase the distributed capacitance and further increases the dielectric loss.

The dialectric loss may be represented by an equivalent series resistance:

(11) $$R_D = \frac{F_P}{2\pi f C}$$

Where:

$R_D$ = equivalent series resistance
$F_P$ = power factor of distributed capacity
$f$ = frequency
$C$ = distributed capacitance When considering total coil loss, this equivalent series resistance representing dielectric loss must be added to the total coil resistance. Equation 11 shows that $R_D$ is inversely proportional to the frequency.

An inductance loss is also sustained by bringing the diaphragm is close proximity to the active surface of the coil producing a reduction in the effective inductance of the coil. This is a result of the metallic sheet acting as a partial non-magnetic shield which interferes with the total flux produced by the coil. Reducing the number of flux lines has the effect of increasing the magnetic reluctance of the coil.

Figure 4:
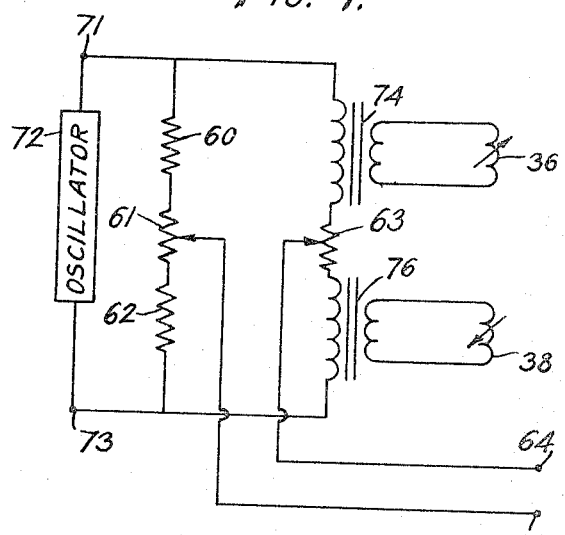
FIGURE 4 is another circuit arrangement including the transducer of FIGURES 1 and 2, transformer coupled for AC output.
Figure 5:
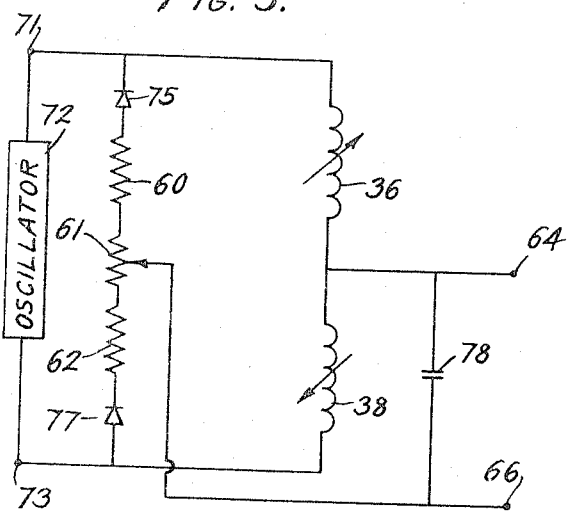
FIGURE 5 is a circuit arrangement including the transducer of FIGURES 1 and 2 modified to provide a DC output.

The variable eddy current transducer of this invention normally would be used as one or more of the active arms of an electrical bridge circuit. The circuits of FIGURES 3, 4 and 5 illustrate several versions of AC bridge circuits for obtaining DC and AC outputs. The circuit of FIGURE 3 illustrates a form of AC bridge with transducer coils 36 and 38 forming the active arms and resistive elements 60 and 62 forming the passive arms. Resistive elements 60 and 62 may be variable to provide for an electrical balance of the transducer. In certain cases it may be desirable to substitute for one of the two transducer coils an inactive arm or fixed coil diaphragm arrangement. A suitable resistance, capacitance, inductance or suitable combination of same may also be substituted for one of the coils as only a single coil is required to produce an output signal from such a circuit. An oscillator 72 is connected across the bridge input terminals 71 and 73 and when arm elements 36, 38, 60 and 62 are balanced, the output appearing between terminals 64 and 66 will be zero. When the losses in coils 36 and 38 are varied by movement of diaphragm 22 closer to one and away from the other, this unbalance produces a voltage across terminals 64 and 66 as an output signal.

FIGURE 4 illustrates a modified bridge circuit where the transducer arms are connected to the secondary windings of saturable transformers 74 and 76 and present variable impedance loads thereto. The primary windings are connected as two active arms of the bridge. This circuit has advantages where it is desired to change the impedance levels between that of the transducer and the output of the bridge across terminals 64 and 66. Where air core coils are used in the transducer, the impedance may be on the order of 10–50 ohms, which is suitable for long cable runs. Connecting such a transducer in the circuit of FIGURE 4 would require much less driving power from oscillator 72 than required for the circuit of FIGURE 3.

The circuit shown in FIGURE 5 illustrates a further circuit modification of a bridge for obtaining a DC bridge output. The output across terminals 64 and 66 is polarity sensitive and will reverse polarity depending on which direction the transducer is unbalanced. The diodes 75 and 77 provide for sampling of the bridge unbalance every one-half cycle of the input supply for presentation at output terminals 64 and 66 as a DC voltage proportional to transducer unbalance. The capacitor 78 serves to filter the half wave DC output and may be replaced by a more sophisticated filter for improved high frequency response.

Null balancing in the AC bridge circuits of FIGURE 3 and 4 is accomplished by means of variable resistors 61 and 63 with 61 being used to balance out the resistive component and 64 being used to obtain a reactive balance between the two transducer arms. With the DC output circuit of FIGURE 5, only one resistor 61 is needed to obtain a zero DC output.

Tests were conducted to verify the theoretical considerations. It was found that the thickness of the diaphragm required for maximum output at a given frequency was considerably less than that predictable solely from the skin depth equations.

The effect of different diaphragm materials is illustrated by the data in Table I which shows the relative output voltage obtained from the transducer in FIGURES 1 and 2 with different materials used for the diaphragm. In each case, the diaphragm is at least three "skin depths" in thickness at 1 megacycle input frequency. The tests were all made with a .005″ total change in the diaphragm-to-coil air gap, from a .006″ gap to a .001″ gap, and the coils consisted of 80 turns of #34 single enamel wire to form a coil .040″ thick and ⅜″ in diameter.

TABLE I

| Material | Alloy | Thickness, inches | Output, $E_o$ | Resistivity, ohm-m. $\times 10^8$ |
|---|---|---|---|---|
| Silver | 99.9% | .009 | +.160 | 1.59 |
| Copper | 99.9% | .007 | +.158 | 1.71 |
| Aluminum | 99.0% | .0095 | +.158 | 2.92 |
| Brass | {33% Cu, 68% Zn} | .042 | +.138 | 6.4 |
| Beryllium-Copper | #25 | .010 | +.138 | 4.82 |
| Phosphor Bronze | Type A | .007 | +.135 | 9.6 |
| Copper-Silver | {35% Ag, 65% Cu} | .010 | +.126 | ----- |
| Titanium | 99.0% | .033 | +.090 | 55.0 |
| Stainless Steel | #321 | .026 | +.088 | 72.0 |
| Invar | {36% Ni, 64% Fr} | .013 | −.022 | 81.0 |
| Monel | ---------- | .031 | −.017 | 53.2 |

The input voltage for the results shown in Table I was 3 volts. As shown by the table, the greatest output is obtained with the material having the greatest conductivity and lowest resistivity. Such materials will introduce the greatest $I^2R$ losses into the circuit.

As previously pointed out, for maximum output of a transducer of this invention, the diaphragm material must have a permeability not significantly greater than about one, i.e., be non-magnetic. Two materials, Invar and Monel, having approximate permeabilities of 5000 and 2000 respectively are included in the table for comparison. The output with these materials is shown as a reverse polarity, to indicate a slight over-all gain being produced in the circuit by these materials, rather than a loss, as the air gap is reduced which is due to increasing the coil inductance.

The foregoing skin depth considerations indicate that at a given frequency a diaphragm of less than a given thickness will result in less than maximum transducer output. Also, a diaphragm thicker than the given thickness will produce no greater output. Further, the minimum diaphragm thickness for maximum output should decrease as the input frequency increases.

Tests were carried out to verify these findings. Two open ended coil forms were wound with 120 turns of #36 single enamel wire. The circuit was that of FIGURE 3 with resistances 60 and 62 each being 25 ohms. The input signal to the bridge from oscillator 72 was maintained at one volt.

The output voltage $E_o$ for a given diaphragm thickness and frequency was determined by first placing a .005″ Mylar spacer between each coil and its diaphragm and subtracting this output voltage from the output voltage obtained when the spacer is removed from between one coil and its diaphragm where the coil is in direct contact therewith. The diaphragms comprised one or more .00113″ thick electrolytic sheets of copper.

Referring now to FIGURES 12 and 13, there is shown a displacement transducer 80 which embodies the teaching of the present invention. The transducer 80 comprises two coils 82 and 84 wound on a non-magnetic dielectric core 86 of a ceramic material and the like. The coils 82 and 84 terminate in a pair of leads 88 and 90 for connection to an electric circuit. The core 86 is shown to be of cylindrical configuration and the coils 82 and 84 are wound into axially spaced slots 92 and 94 located in the cylindrical surface of the core. The coils 82 and 84 and slots 92 and 94 are of a configuration to provide a maximum number of the turns of the coils in a plane normal to the cylindrical axis such that each coil will have a minimum dimension in the direction along the cylindrical axis. A non-magnetic, dielectric sleeve 100 is positioned around core 86 and provided with slots 96 and 98 paralleling the cylindrical axis of the core and connecting slots 92 and 94 for the egress of leads 88 and 90 from coils 82 and 84 to the rear of the core 86 for external connections. An open ended magnetic shield 102 is positioned around the sides and rear of core 86 and the rear thereof is provided with an opening 104 into which is secured a threaded hollow stud 106. The electrical leads 88 and 90 extend through opening 104 and stud 106 to the exterior of the transducer. A protective shield 108 is positioned over magnetic shield 104 and may also be secured to stud 106. In operation, transducer 80 senses the presence and proximity of the surface of a non-magnetic, electrical conducting metal plate 109 to the active face 110 of the transducer. Plate 109 should be a metal such as aluminum, copper, magnesium 300 series stainless steel and the like having good electrical conductivity. Plate 109 should have a thickness of about or greater than the skin depths of the currents therein at the frequencies employed.

The coils 82 and 84 of transducer 80 are connected as arms of a bridge circuit and the proximity of a conductive plate 109, produces an impedance change in the coils that results in an unbalance in the bridge circuit providing an output signal therefrom representative of the displacement of the plate from the transducer. Coil 84 is for purposes of explanation identified as the main coil and coil 82 is identified as the balancing coil.

Figure 10:
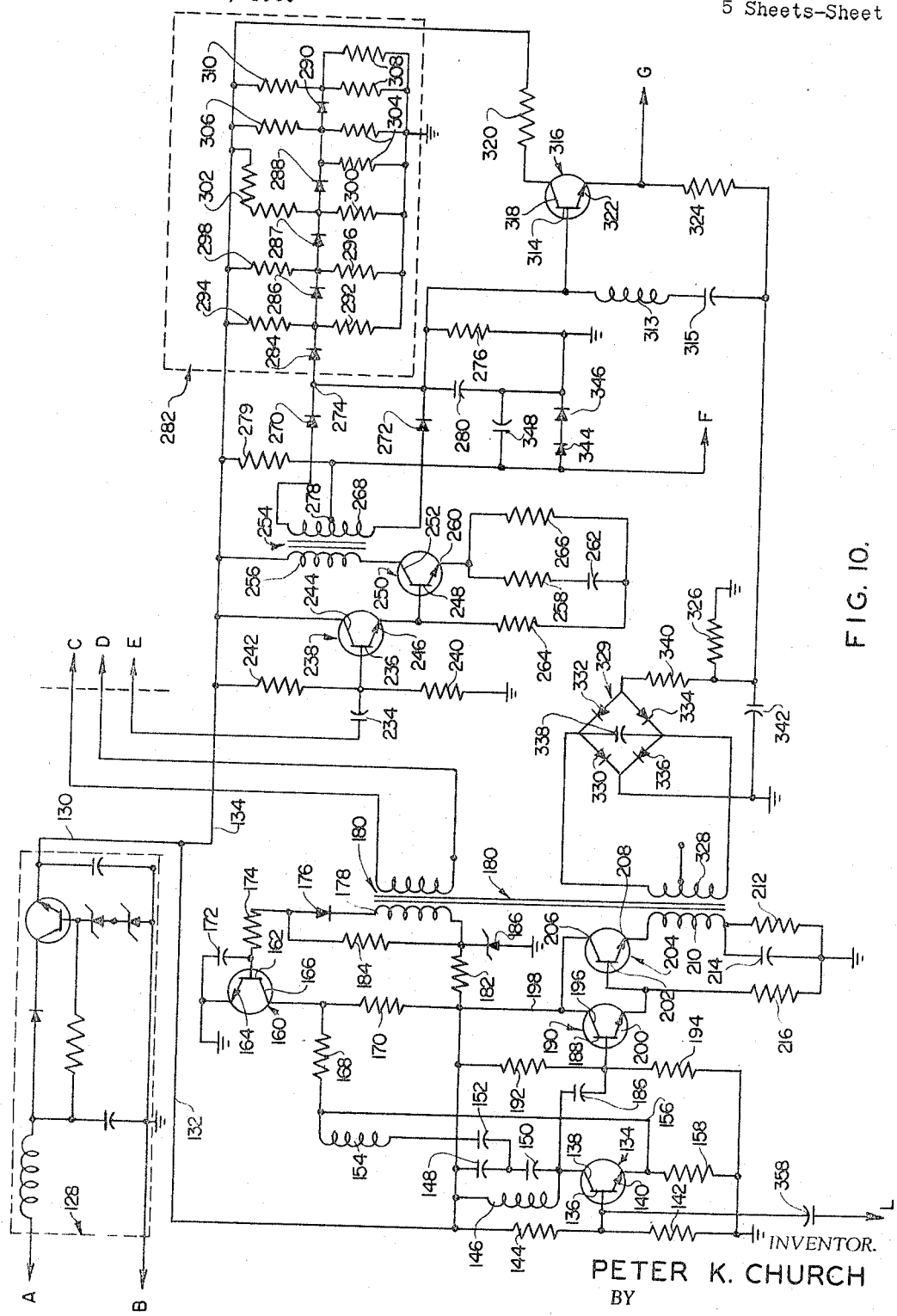

Referring now to FIGURES 10 and 11 which together comprise the preferred electrical circuitry to be employed with the displacement transducer of this invention. More specifically, the circuitry includes a power supply 112 contained within the dotted line to supply AC and DC currents for the operation of the circuit. The plug 114 may be connected to an appropriate source of alternating current which is fused by fuse 116 and switched by double pole switch 118. The power supply has a switched AC output as at 120 and a DC output as at 122 is connected to terminal A. The ground connection of power supply 112 is connected to terminal B. The AC output 120 is connected to the heater and control 124 of a constant temperature oven 126 within which is located the circuit of FIGURE 10.

Referring now to FIGURE 10, terminals A and B of FIGURE 11 connect respectively to terminals A and B of FIGURE 10 which lead to a voltage regulator 128. The voltage regulator comprises a Zener diode controlled amplifier stage to provide a constant output voltage to appear on the output 130 thereof. The regulated output voltage from regulator 128 is conducted from output 130 via conductors 132 and 134 to the balance of the circuits of FIGURE 10. To the left side of the diagram, there is provided an oscillator stage comprising transistor 134 having a base 136, a collector 138 and an emitter 140. Resistor 142 from base 136 to ground potential and resistor 144 from base 136 to regulator output 130 serve to bias transistor 134 and set the operating level. An inductance 146 and series capacitors 148 and 150 between the collector 138 and regulator output form the tuned circuit for oscillator 134. An oscillator feedback loop is formed between the collector 138 and emitter 140 of oscillator 134 serially via capacitor 152, connected to the common juncture of capacitors 148 and 150, via inductance 154 and conductor 156 to emitter 140. Capacitor 152 and inductance serve to control the oscillator feedback. Resistor 158 connected between emitter 140 and ground potential functions with the transistor 160 to regulate the current drawn by oscillator transistor 134. Transistor 160 has a base 162, an emitter 164 and a collector 166. A resistor 168 is connected between the emitter 140 of transistor 134 and the collector 166 of transistor 160. The collector 166 of transistor 160 is connected to the output 130 of voltage regulator via resistor 170 and conductor 132. The emitter 164 thereof is connected to ground potential and the base 162 is by-passed to ground by capacitor 172. The base 162 is connected to the output 130 of the voltage regulator via resistor 174, diode 176, primary winding 178 of output transformer 180 and resistor 182. Resistor 184 is connected in parallel to shunt diode 176 and winding 178. A Zener diode 186 is connected between the common juncture of resistors 182, 184, coil 178 and ground potential. An output voltage developed across winding 178 of transformer 180 above a predetermined amplitude will be rectified by diode 176 and control transistor 160, which in turn controls the output of oscillator transistor 134. Zener diode 186 and resistor 182 provide a predetermined reference voltage against which the oscillator voltage is compared. If the output voltage is greater than the reference voltage, diode 176 conducts turning on transistor 160 and reduces the amplitude of the output of transistor oscillator 134.

The output from the collector 138 of transistor oscillator is capacity coupled by capacitor 186 to the base 188 of transistor 190. Resistors 192 and 194 establish the base bias operating conditions for transistor 190 whose collector 196 is connected to the output 130 of the voltage regulator 128 via conductors 198 and 132. The emitter 200 of transistor 190 is directly connected to the base 202 of transistor 204. The collector 206 is connected to collector 196 of transistor 190. The emitter 208 is connected to ground potential serially through winding 210 of transformer 180 and resistor 212 having capacitor 214 connected thereacross. Resistor 216 connects base 202 of transistor 204 to ground potential to establish the operating bias of transistor 204.

Winding 218 of transformer 180 is connected via terminals C and D to the input of a bridge network 220 having the main coil 84 of transducer 80 as one arm and the balance coil 82 as another arm, with resistors 222 and 224 as the fixed arms. An AC balance of the bridge 220 is provided by the fixed resistor of potentiometer 226 being connected across the input to the bridge and the sliding tap 228 thereof being connected to the juncture 232 of resistors 222 and 224 via resistor 230. The output from bridge 220 resulting from any unbalance thereof will appear between juncture 232 and ground potential since both the main and balance coils 84 and 82 have their common juncture at ground potential. The bridge output or error signal is connected via terminal E serially through capacitor 234 to the base 236 of transistor 238. Base 236 is connected to ground potential via resistor 240 and to the output 130 of the voltage regulator via resistor 242. Resistors 240 and 242 provide operating bias for the transistor 238 which presents a high impedance to the incoming error signal. The collector 244 is directly connected to the output 130. Output from the emitter 246 of transistor 238 is directly coupled to the base 248 of transistor 250. The transistor 250 provides an amplifier whose gain can be made to vary and the gain will be a function of the load presented to the collector 252, namely, the impedance presented by transformer 254 on winding 256. The initial gain of transistor 250 is established by resistor 258 from emitter 260 in series with capacitor 262 to ground potential with base bias being furnished by resistor 264. A DC current path is completed to ground through resistor 266. The ends of the center-tapped winding 268 of transformer 254 are connected through diodes 270 and 272 and their juncture 274 with resistor 276 to ground potential. With the center-tap 278 of winding 268 at ground potential, diodes 270 and 272 function as a full wave rectifier detector with resistor 276 providing the load resistance and capacitor 280 providing filtering action. The output of the detector at 274 is also connected to a shaping circuit 282 made up of serially connected diodes 284, 286, 287, 288 and 290. The juncture of diodes 284 and 286 is connected to ground potential via resistor 292 and to output 130 of the voltage regulator via resistor 294. The juncture of diodes 286 and 287 is connected to ground potential via resistor 296 and to output 130 of the voltage regulator via resistor 298. The juncture of diodes 287 and 288 is connected to ground potential via resistor 300 and to output 130 of the voltage regulator via resistor 302. The juncture between diodes 288 and 290 is connected to ground potential via resistor 304 and to the output 130 of the voltage regulator via resistor 306. The end of diode 290 is connected to ground potential via resistor 308 and to output 130 of the voltage regulator via resistor 310.

The values of the resistors in the shaping circuit 282 are chosen to provide a predetermined voltage of increased magnitude successively at junctures of diodes 284–286; 286–287; 287–288; and 288–290. Thus, as the output voltage from detectors 270 and 272 exceeds the voltage at a particular junction, all the resistances, i.e. 292, 296, 300, 304 and 308 preceding the juncture are introduced as part of the load in parallel with resistor 276 lowering the impedance of the detector which in turn lowers the impedance of transistor 250 reducing its gain. Now for a given signal input from the transducer 80 to terminal E, a lower output is developed in the detector formed by diodes 270 and 272 across load resistor 276 and any of the other resistors 292, 296, 300, 304 and 308 whose effect is in the circuit. The shaping circuit 282 by proper choice of component values can further extend the inherent linearity of the displacement transducer according to the invention.

In the above analysis, the center-tap 278 of winding 268 of transformer 254 was considered to be at ground potential while in fact the center-tap 278 is connected to the regulator output 130 through resistor 279 and is normally fed with a slight positive bias voltage via terminal F and variable resistor 312 connected to ground potential, FIGURE 11. The output across load resistor 276 of the detector including diodes 270 and 272 is directly coupled to the base 314 of transistor 316. The collector 318 is connected to the output 130 of voltage regulator 128 via resistor 320. The emitter 322 feeds output terminal G direct and is connected to ground potential via resistors 324 and 326. The emitter 322, in the absence of a signal from the transducer 80 via terminal E, would be at some slight positive potential; therefore, for the purposes of obtaining a zero output, the emitter 322 is returned to slight negative potential developed from secondary winding 328 of transformer 180 and rectified by full wave diode bridge 329 made up of diodes 330, 332, 334 and 336 having filter capacitor 338 across the input. The output of bridge 329 is fed via resistors 340 and 324 to the emitter 322 driving same slightly negative. Capacitor 342 serves to filter the output of bridge 329.

The voltage fed to the emitter 323 of transistor 316 is fixed, while the voltage at terminal F is adjustable to provide zero output at terminal E. This is accomplished as follows: the voltage drop across diodes 344 and 346 varies with the current therethrough. Diode 346 is chosen such that the voltage drop thereacross is such as to compensate for the base-emitter drop of transistor 316, and he drop in diode 344 is chosen to be sufficient to compensate for the forward conducting drop of either diode 270 or 272, depending on which one is normally conducting. Capacitor 348 provides filtering. For a zero balance of the output with no input signal, the base 314 of transistor 316 should be slightly positive similar to the drop across diodes 270 and 272 at the point where they just start to conduct. This positive voltage is adjusted by setting variable resistor 312, FIGURE 11, to such a value to give a zero output at terminal G. Inductance 131 and capacitor 315 form a series resonant filter for base 314 of transistor 316. The output from terminal G is fed to an output control 316, FIGURE 11, made up of potentiometer 350 and filter 352. A selected portion of the output is available at terminals H and J depending upon the adjustment of potentiometer 350, and terminal K connects the shield of an output cable, not shown.

Coils 82 and 84 of FIGURE 11 represents the two coils of the displacement transducer 80, and are also shown in FIGURES 12, 13, 14, 15 and 16. Connected in parallel with coils 82 and 84 are peaking capacitors 356 and 354 respectively, which are selected to provide a predetermined transducer sensitivity. The two parallel LC circuits thus formed constitute the two active arms of a 4 arm AC impedance bridge. Resistors 222, 224, 226 and 230 form the remainder of the bridge. Resistor 226 is a potentiometer which is provided for adjusting the bridge to balance. The 4 arm bridge operates as follows:

A constant amplitude 1 mHz. sine wave signal, which is isolated from ground, appears across terminals C and D from the circuit of FIGURE 10. With the material to be detected positioned somewhat beyond the maximum displacement range of the trandsucer, potentiometer 226 is adjusted for a minimum 1 mHz. signal between terminal E and ground. If the material to be detected is now caused to move toward a position of minimum displacement, the bridge becomes increasingly unbalanced, and the 1 mHz. signal at terminal E increases in amplitude, which amplitude is a function of the proximity of the material to be detected.

Reference is now made to FIGURE 10. The terminals C, D and E are, as before, the 1 mHz. drive terminals to the bridge, and the bridge unbalance terminal, respectively.

A 1 mHz. drive signal is developed in the oscillator circuit formed by transistor 134; resistors 142, 144 and 158; inductors 146 and 154; and capacitors 148, 150 and 152. The oscillator is capacity coupled by capacitor 186 to a Darlington Amplifier composed of transistors 190 and 204, as well as resistors 192, 194, 216 and 212, and capacitor 214. The output of the Darlington Amplifier is connected to the primary coil 210 of the drive transformer 180. One of the secondary coils is connected to terminals C and D and thus provides the 1 mHz. signal to bridge. The amplitude of this 1 mHz. output signal is stabilized by negative feedback in the following manner:

The voltage developed across secondary coil 178, which is proportional to the output secondary voltage, is detected by diode 176 and resistor 184, and smoothed by resistor 174 and capacitor 172. Transistor 160 amplifies the resulting DC signal and feeds it back to the emitter circuit of transistor 134 in such a way as to tend to reduce the amplitude of the oscillator output (i.e., negative feedback).

Figure 18:
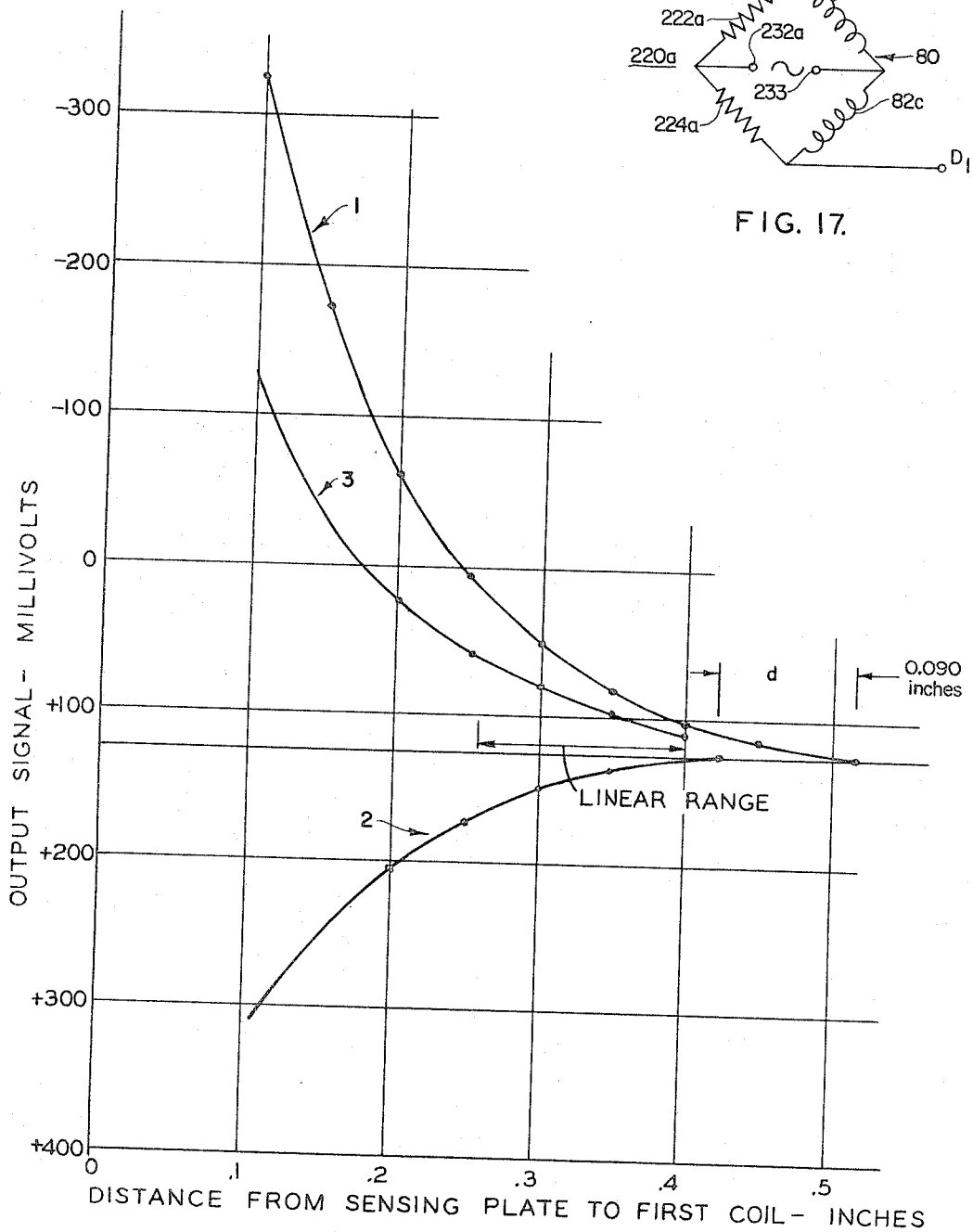

Unbalance from the transducer bridge at terminal E is not altogether a linear function of the distance between the transducer and the target, or sensing plate as shown in FIGURE 18. Since a greater degree of linearity is generally desired for the overall system response, the bridge unbalance is amplified by a logarithmic suppression type amplifier. This amplifier operates as follows:

The 1 mHz. unbalance from the transducer bridge at terminal E is capacity coupled to the base of the emitter follower composed of transistor 238 and resistors 242, 240 and 264 by capacitor 234. The emitter follower drives the voltage amplifier composed of transistor 250, resistors 258 and 266, capacitor 262 and primary coil 256 of transformer 254. The secondary coil of transformer 254 is connected to diodes 270 and 272, resistor 276 and capacitor 280 which together form a 1 mHz. full wave detector. A DC voltage therefore appears between juncture point 274 and ground. Circuit 282, enclosed in dotted lines, is connected to juncture 274 and acts as a voltage sensitive resistive load on the detector. The resistance of this load decreases with increasing positive voltage at point 274, thereby tending to "load down" the detector and improve the linearity of the system. The degree of linearizing required varies depending upon the design of the transducer and target material. Resistors 292 through 310 in circuit 282 are therefore selected for the particular transducer and target material in use. Detector output is connected to the base of the emitter follower output stage composed of transistor 316; 1 mHz. shunt filter 313 and 315; and resistors 320 and 324. Transformer secondary 328 and diodes 330 through 336 form a negative voltage bias supply for the output stage.

Referring again to FIGURE 11, potentiometer 350 acts as a span control on the DC output signal and variable resistor 312 provides DC null adjustment of the output signal.

Referring now to FIGURES 14, 15 and 16, there are shown several arrangements of the coils of the displacement transducer according to this invention in schematic form. FIGURE 14 represents a transducer 80a wherein coil 82a is of a smaller diameter than coil 84a and lies in the same plane. In this embodiment, the distance $d$ from plate 109 to each coil is the same. FIGURE 15 represents a transducer 80 wherein coil 82 is the same diameter as coil 84, but is located a greater distance $d_1$ from plate 109 than coil 84, which is located at distance $d_2$ therefrom. FIGURE 16 represents a further arrangement wherein coil 82 is of a larger diameter than 84b and is located at a distance $d_1$ from plate 109, which distance is greater than distance $d_2$ from plate 109 to coil 84b. In each instance, coils 84, 84a and 84b are the main coils and coils 82, 82a and 82b are the balancing coils. In each embodiment, either because of size or position, the plate 109 has less effect on the coils 82, 82b and 82a than on main coils 84, 84a and 84b.

Figure 17:
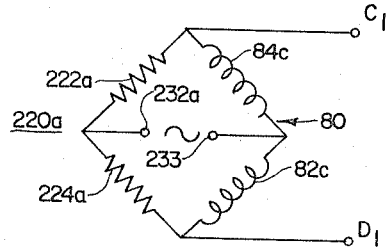
FIGURE 17 is a schematic diagram of a bridge circuit including the transducer according to the present invention on which the curves of FIGURE 18 were obtained; and, FIGURE 18 is a graphical representation of curves obtained from the circuit of FIGURE 17, with the main coil alone, the balancing coil alone and a composite of both coils.

Referring now to FIGURE 17, there is shown a schematic diagram of a bridge circuit 220a made up of two resistors 222a and 224a and two coils 82c and 84c. Coils 82c and 84c are 0.75 inch in diameter and comprise 11 turns of 34 gauge copper wire each and axially spaced 0.090 inch. A high frequency AC input voltage on the order of one mega Hz. was connected across terminals C and D, and an AC output voltage from output terminals 232a and 233 was fed into a phase sensitive demodulator circuit to obtain DC output values as set forth in Table II.

TABLE II

| Displacement of plate from main coil in inches | Output voltage main coil | Output voltage balance coil | Output voltage main and balance coils |
|---|---|---|---|
| 0.10 | 0.323 | | |
| 0.15 | 0.170 | | |
| 0.20 | 0.061 | −0.208 | −0.022 |
| 0.25 | −0.006 | −0.175 | −0.056 |
| 0.30 | −0.050 | −0.150 | −0.075 |
| 0.35 | −0.080 | −0.135 | −0.090 |
| 0.40 | −0.104 | −0.127 | −0.106 |
| 0.45 | −0.118 | −0.125 | −0.118 |

The values of Table II are plotted as curves 1, 2 and 3 of the graphical representation of FIGURE 18. Curve 1 of FIGURE 18 illustrates the effect of changing the displacement between a flat electrically conductive plate 109 and the main sensing coil 84 of a variable impedance displacement transducer 80 according to the teaching of this invention. The balancing coil 82 has been physically removed from the transducer body a sufficient distance where it will not be affected by the presence of the conductive plate 109, but is connected into the electrical bridge circuit. Therefore, curve 1 of FIGURE 18 shows only the output of the electrical bridge circuit due to the displacement effect of plate 109 on the main coil 84 only.

Curve 2 of FIGURE 18 illustrates the effect of changing the displacement between a flat electrically conductive plate 109 and the balance sensing coil 82 of a variable impedance displacement of transducer 80 according to the teaching of this invention. The main coil 84 has been physically removed from the transducer body a sufficient distance where it will not be affected by the presence of the conductive plate 109, but is connected into the electrical bridge circuit. Therefore, curve 2 of FIGURE 18 shows only the output of the electrical bridge circuit due to the displacement effect of plate 109 on the balance coil only. The polarity of the output from the balance coil 82 is the reverse of the main coil 84 because the balance coil is located in the adjacent arm of the bridge.

Curve 3 of FIGURE 18 illustrates the effect of changing the displacement of plate 109 on the bridge circuit output with both the main coil 84 and balance coil 82 seeing the conductive plate. The distance $d$ separating the main coil 84 and balance coil 82 is 0.090 inch, which relative positions were maintained in obtaining the data for curves 1 and 2. It is readily seen that the balancing effect of balance coil 82 provides a significant improvement in the linearity of output voltage as a function of displacement over a usable portion of curve 3. The compensation afforded by the balance coil can be accomplished by using a coil of similar diameter positioned at a greater distance from the conductive plate 109, as shown in FIGURES 12, 13 and 15. Compensation may also be accomplished by the use of a smaller diameter balance coil positioned the same distance from the conductive plate 109 as the larger main coil, as is shown in FIGURE 14, or by using a smaller diameter main coil positioned closer to the conductive plate 109 than the larger balance coil, as shown in FIGURE 16. It will be appreciated that in the oscillator-demodulator circuit of FIGURE 10, the shaping circuit 282 may be designed to further extend the improvement linearity range of the transducer 80 by appropriate component selection.

It will be appreciated that the electrical conducting plate 109 will have the greatest effect in varying the impedance of the closest coil where the coils are of the same diameter and electrical characteristics. In similar fashion, the greatest impedance change effect will occur in the coil of the larger diameter where the coils lie in the same plane. Since the balance coil is either axially shifted with respect to the main sensing coil or its electrical effect is shifted, the net effect provides a substantially linear relationship between the movement of the electrical conducting plate and the output signals from the bridge circuit.

While there has been described what at present are considered to be the preferred embodiments of the present invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A variable impedance displacement transducer which comprises at least two coils, a constant voltage input AC bridge, each coil being connected as an arm in said AC bridge, a non-magnetic electrical conducting means movably positioned immediately adjacent to and to one side of said coils for movement toward and away from said coils and means for applying a force for causing said non-magnetic means to move with respect to said coils and vary the effective impedance of said coils as a function of such movement to unbalance the bridge circuit and produce an output representative of the proximity of the conducting means to said coils.

2. The displacement transducer of claim 1 wherein the coils are connected as adjacent arms of the bridge circuit.

3. The displacement transducer of claim 1 wherein the coils are of substantially the same diameter and are axially spaced one from the other.

4. The displacement transducer of claim 1 wherein the coils are of substantially different diameters located in the same plane.

5. The displacement transducer of claim 1 wherein the coils are of different diameters axially spaced one from the other.

6. A variable impedance transducer which comprises a constant voltage input AC bridge circuit, two coils connected as adjacent arms of said AC bridge circuit, a non-magnetic electrical conducting means movably positioned immediately adjacent to and located on the same side of said coils for movement toward and away from the side of said coils, and means for applying a force for causing said non-magnetic means to move with respect to said coils and vary the effective impedance of said coils to unbalance said bridge circuit, producing an output signal representative of the proximity of said conducting means to said coils.

7. The displacement transducer of claim 6 wherein said coils are mounted on a core of non-magnetic, dielectric material and wherein the coils are of substantially the same diameter axially spaced one from the other.

8. The displacement transducer of claim 6 wherein said coils are mounted on a core of non-magnetic dielectric material and wherein the coils are of substantially different diameters located in the same plane.

9. The displacement transducer of claim 6 wherein said coils are mounted on a core of non-magnetic, dielectric material and wherein the coils are of different diameters axially spaced one from the other.

References Cited
UNITED STATES PATENTS

| | | | |
|---|---|---|---|
| 2,065,119 | 12/1936 | Davis | 324—40 |
| 2,510,073 | 6/1950 | Clark. | |
| 3,058,076 | 10/1962 | Hasler et al. | 323—51 X |
| 3,101,462 | 8/1963 | Swainson | 336—30 X |
| 3,238,479 | 3/1965 | Church | 336—30 |

OTHER REFERENCES

Gunn: Flaw Detection in Nonmagnetic Metals, Journal of Applied Mechanics (Trans ASME), vol. 8, No. 1, March 1941, pp. A–22–A–26.

Joseph and Newman: "Eddy-Current Mutual Inductance Transducers With High-Conductivity Reference Plates," AIEE Transactions, vol. 74, Part I, 1955, pp. 39–49. TK1A6.

Lion: Instrumentation in Scientific Research, McGraw-Hill, 1959, QC543L6, pp. 52–56.

JOHN F. COUCH, *Primary Examiner.*

A. D. PELLINEN, *Assistant Examiner.*